United States Patent [19]

Bjorkman

[11] 3,838,342

[45] Sept. 24, 1974

[54] A SWITCHED FREQUENCY COMMUNICATIONS SYSTEM WITH AUTOMATIC PHASE AND AMPLITUDE COMPENSATION

[75] Inventor: Bengt Harry Bjorkman, Skalby, Sweden

[73] Assignee: U.S. Philips Corporation, New York, N.Y.

[22] Filed: Dec. 22, 1970

[21] Appl. No.: 100,684

[30] Foreign Application Priority Data

Dec. 23, 1969 Switzerland....................... 17909/69

[52] U.S. Cl. ................ 325/32, 179/1.5 FS, 325/42, 325/45, 325/476

[51] Int. Cl. .............................................. H04k 1/04

[58] Field of Search ............. 325/42, 45, 47, 62, 65, 325/347, 473, 476, 32; 179/1.5 R, 1.5 FS

[56] References Cited

UNITED STATES PATENTS

| | | | |
|---|---|---|---|
| 3,614,626 | 10/1971 | Dillard | 325/476 |
| 3,681,708 | 8/1972 | Olmstead | 325/32 |

FOREIGN PATENTS OR APPLICATIONS

| | | | |
|---|---|---|---|
| 594,539 | 11/1947 | Great Britain | 325/34 |

*Primary Examiner*—T. H. Tubbesing
*Assistant Examiner*—H. A. Birmiel
*Attorney, Agent, or Firm*—Frank R. Trifari; Simon L. Cohen

[57] ABSTRACT

A communications device consisting of a transmitter that produces a phase modulated signal that is switched to a plurality of different frequencies according to a preselected program, and a receiver that mixes the received signal with a sequence of frequencies equal to the transmitted frequencies plus or minus a fixed intermediate frequency. In order to compensate for the different phase shifts produced by the interaction of the different transmitted frequencies with various fixed obstructions the phase of the intermediate frequency in the receiver corresponding to each transmitted frequency is measured, compared with a fixed phase reference oscillator and stored. The stored phase information relating to each transmitted frequency is used to control a phase shifter in the receiver during subsequent transmissions of the corresponding frequency, thereby completing a phase correction control loop. A similar comparison, storage, and control feedback loop is used in conjunction with an AVC amplifier in order to individually control the amplitude of each received frequency.

4 Claims, 3 Drawing Figures

PATENTED SEP 24 1974 3,838,342

*INVENTOR.*

BENGT HARRY BJORKMAN

*BY*

Frank R. Trifari

AGENT

Figure 1:
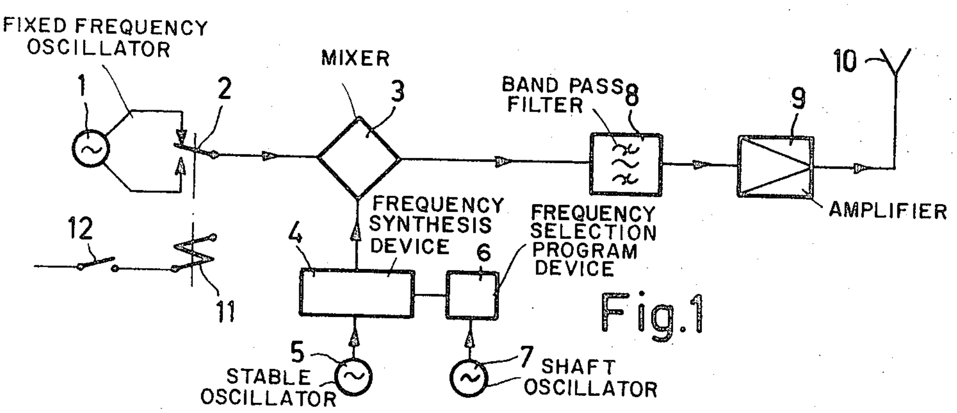

A SWITCHED FREQUENCY COMMUNICATIONS SYSTEM WITH AUTOMATIC PHASE AND AMPLITUDE COMPENSATION

The invention relates to a device consisting of encoding transmitter and receiver for transmission of information by means of a high frequency carrier. The frequency of the carrier is varied in steps between different levels according to a predetermined pattern by a periodically operating control device arranged in the transmitter. The receiver comprises a mixer in which the incoming carrier is combined with a frequency which by means of a similar control device is brought to vary according to the same pattern as the frequency of the transmitted carrier. By means of this mixer a signal having a small band width will be obtained in the receiver in spite of the fact that the frequency of the transmitted carrier varies across a wide frequency range. The varying frequency of the transmitted carrier will make it difficult for an unauthorized receiver to interprete the information, because without knowledge of the frequency code it would be necessary to scan the entire frequency band. If other unrelated signals also appear within the actual frequency range the interpretation of the transmission will be even more difficult because it then will be to determine which frequencies originate at the encoding transmitter.

If transmission can be effected with a sufficiently low power it will furthermore be possible to prevent an unauthorized receiver from determining that transmission takes place. Messages can thus be transmitted when radio silence has been demanded. For this purpose the authorized receiver must have an extremely small band width, and of course the information quantity which can be transmitted per time unit will be relatively small.

During short wave transmission the signal received by the receiver is usually composed of two or more components, for example a ground wave and an atmospheric wave or several ground waves reflected against different targets in the surroundings. Those components in the received signal, which originate from reflected waves, will be frequency dependent due to the fact that they are reflected from different points and thereby will have different distances of travel depending on the frequency. The resulting signal in the receiver will therefore be phase modulated in rhythm with the frequency change and as a consequence of this also amplitude modulated. As a result the incoming carrier will have side bands which contain a portion of the transmitted power. In a receiver having an extremely small band width the power in these side bands will be lost. Alternatively the receiver has to be made with a greater band width, an increase of received noise would result therefore necessitating an increase of the transmitted power.

The invention eliminates the said drawbacks and offers the possibility of having an extremely small band width in the receiver without loss of information. The invention is based upon the fact that the conditions in the atmosphere or the surroundings can be assumed to be relatively stable during a transmission period and will not change essentially from the moment a certain frequency appears to the next interval the same frequency reappears.

The invention produces these results by including a phase shifter in the receiver connected to the mixer. The phase shifter can either be arranged on the output side of the mixer or connected to one of its supply lines. The invention further provides means for detecting the phase position of the incoming carrier relative to the phase of a locally generated wave and a memory comprising as many memory positions as the number of frequencies operating in rhythm with the frequency change and connected to the output of the said phase detecting means. For each new frequency information is stored about the phase position of the actual frequency relative to the reference phase. The memory is adapted to control the phase shifter in such manner that this phase shifter for each new frequency is set in a position corresponding to a value stored in the memory and representing the detected phase position during previous intervals with the same frequency in order to maintain substantially constant phase position of the signal appearing after the mixer and phase shifter.

Because the phase shifter for each new frequency is set to a new value based upon the measured phase position of the incoming carrier during previous intervals with the same frequency the phase variations will be substantially compensated. Remaining phase steps in the signal at the output of the phase shifter will then be substantially only those which depend upon variations in the surroundings or the atmosphere during intervals between transmission moments for one and the same frequency.

In one embodiment of the device according to the invention the added frequency in the receiver lies at a fixed distance from the frequency of the incoming carrier so that at the output of the mixer will be obtained a constant intermediate frequency, in which case the phase shifter is arranged at the output side of the mixer so that it will operate on the constant intermediate frequency. The phase position of incoming carrier is then detected by means of a phase detector arranged after the phase shifter which detector is fed on the one hand with the output signal of the phase shifter and on the other hand with a phase stable intermediate frequency signal. The output signal from the phase detector will then represent the change in phase position which has occurred from the previous interval when the actual frequency was last transmitted. The memory is then made such that the output magnitude of the phase detector is added tO previously stored value regarding the same frequency.

The invention is illustrated in the accompanying drawing, in which

Figure 2:
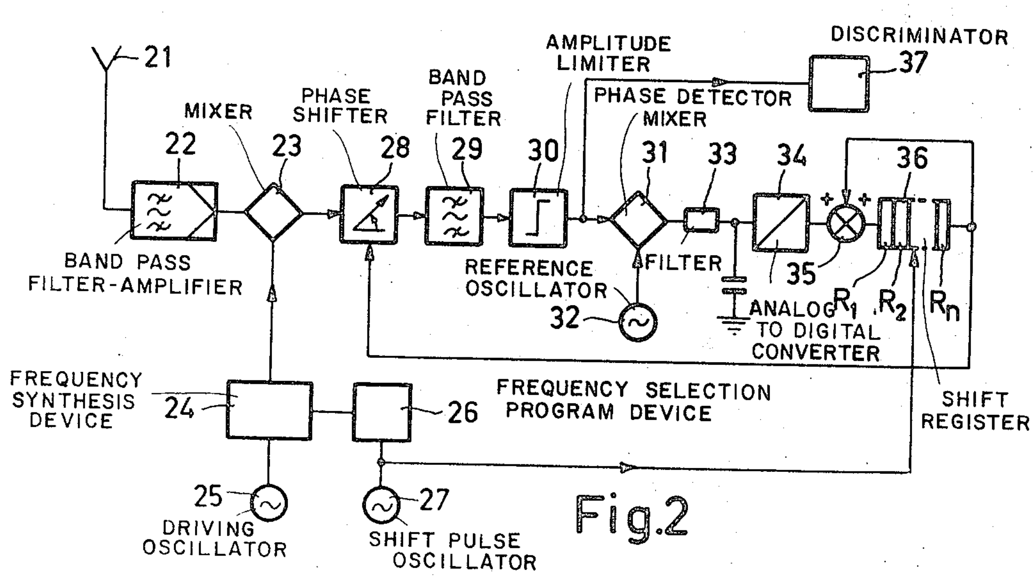
Figure 3:
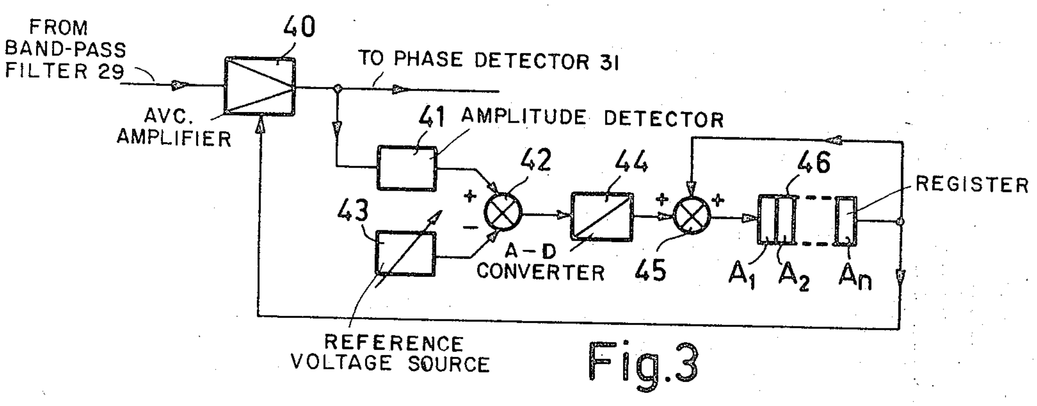

FIG. 1 shows a block diagram for a tranmitter adapted to transmit a carrier with stepwise varying frequency, FIG. 2 shows a block diagram for a receiver with phase compensation according to the invention adapted to receive the carrier transmitted from the transmitter according to FIG. 1 and FIG. 3 shows a circuit which can be connected to the receiver according to FIG. 2 in order to also compensate for variations in amplitude.

In FIG. 1 reference numeral 1 designates an oscillator which delivers a fixed frequency of, for example 10 Mc/s. The oscillator has two outputs delivering voltages which are 180° phase displaced relative to each other. By means of a make-and-break contact 2 either one or the other output is led to a mixer 3. In this the oscillator voltage is combined with the output voltage from a frequency synthesis device 4 which can be of the kind described in Swedish Pat. No. 223 134. The frequency synthesis device is driven by a highly stable oscillator 5. The pattern for the frequency change is determined by a frequency selection program device 6 and the shifting to a new frequency is initiated by pulses from a shift oscillator 7.

The frequency of the output voltage delivered from the frequency synthesis device is assumed by way of example to vary according to the predetermined pattern between 10 and 20 Mc/s. At the output of the mixer 3 then will appear a mixing product which varies stepwise in frequency within the frequency range 20 – 30 Mc/s. This mixing product is separated in a band pass filter 8, amplified in an amplifier 9 and transmitted through an antenna 10.

The phase of the transmitted carrier can for each frequency assume either of two values, which can be designated 0 and 180°. The phase is determined by the position of the make-and-break contact 2, which is controlled by means of a relay winding 11. This is in turn controlled by means of a key contact 12. The transmitted information is assumed to be of binary shape; one of the binary digits being represented by one phase position of the transmitted carrier and the second digit represented by the opposite phase position of the carrier. The digit which is transmitted is determined by the key contact 12. The keying frequency is assumed to be very low, having a magnitude of 1–2 c/s, and the transmitted information quantity per time unit is thus small.

The frequency shift can be effected with a shift frequency having a magnitude of 100 c/s and the shift pulses may for example be derived from a stage of the frequency synthesis device.

FIG. 2 shows a receiver for reception of the varying carrier transmitted from the transmitter according to FIG. 1. The carrier is received by an antenna 21 and amplified in an amplifier 22, in which is included a band pass filter with a large band width. The amplified carrier is led to a mixer 23 in which it is combined with the output voltage from a frequency synthesis device 24. This is driven by a driving oscillator 25 and controlled by means of a frequency selection program device 26 which is shifted to a new frequency by means of pulses from a shift pulse oscillator 27. The frequency synthesis device 24 is constructed in the same manner as the frequency synthesis device 4 in the transmitter. The program device 26 is set in such manner so as to give the same pattern for the frequency change as the program device 6 in the transmitter. For each frequency, however, the frequency delivered by the frequency synthesis device of the receiver deviates a constant magnitude from the corresponding frequency delivered by the frequency synthesis device of the transmitter. Synchronization of the frequency synthesis devices of the transmitter and the receiver is assumed to be ensured in any suitable manner, for example at the beginning of the transmission, whereafter the synchronization is maintained by the high frequency stability of the driving oscillators 5 and 25. At the output of the mixer 23 thus a constant intermediate frequency will be obtained, which is equal to the fixed deviation between the frequencies delivered by the frequency synthesis devices, for example amounting to 1 Mc/s. Due to the fact that the received carrier is composed of several waves, for example a ground wave and an atmospheric wave, the latter varying with frequency due to different travel distances, phase jumps will appear at the output of the mixer 23 in rhythm with the frequency change. According to the invention these phase jumps are compensated for by means of a phase shifter 28 arranged after the mixer 23 and controlled in a manner described below. After the phase shifter 28 thus an intermediate frequency signal will appear in which both the frequency jumps in the incoming carrier and the main part of the phase jumps are eliminated. The signal obtained from the phase shifter is fed through a band pass filter 29 having a very small band width and thereafter through an amplitude limiter 30.

The filtered and limited IF-signal thus obtained is then fed to a phase detector or a second mixer 31 in which it is compared with a phase stable reference signal of nominal intermediate frequency derived from an oscillator 32. The reference signal in practice may be derived from suitable stages of the frequency synthesis device 24. At the output of the phase detector 31 a voltage will appear which represents the deviation in phase between the two applied voltages. After filtering in a filter 33 in which remaining high frequency ripple, if any, is suppressed, the output voltage of the phase detector is led to a converter 34 in which the voltage is converted to digital form. The numeric magnitude appearing at the output of the converter 34, representing the output voltage of the phase detector 31, is then fed through an adding device 35 to a first register $R_1$ in a shift register matrix 36. This comprises as many individual registers $R_1$–$R_n$ as the number of frequencies in the frequency shifting pattern. The matrix is controlled from the oscillator 27 in rhythm with the frequency change in such manner that for each frequency change the information is shifted one step to the right in the drawing, i.e. the numeric information in the register $R_1$ is written into register $R_2$ at the same time as the number registered in the register $R_2$ is written into $R_3$ etc. The number stored in the last register $R_n$ in the matrix is used as a second input to the adder 35. For each frequency change a number will be written in register $R_1$ which is equal to the number which in the foregoing interval was stored in the last register $R_n$ plus the number obtained from the converter 34. It is evident that because the matrix 36 has as many registers as the number of frequencies the two numbers which are combined in the device 35 will always relate to one and the same frequency.

The previously mentioned phase shifter 28 arranged in the intermediate frequency part is controlled by the number which in each time interval is stored in the last register $R_n$. Hereby a closed circuit is formed. The phase shifter can suitably operate linearly so that for each frequency it produces a phase displacement which is proportional to the stored number. The phase shifter is thus set stepwise in rhythm with the frequency change in accordance with the numbers appearing in successive order in the last register $R_n$. This number is for each frequency equal to the number which was written into the first register at the end of the foregoing interval when the actual frequency appeared. The setting of the phase shifter will thus for each frequency be determined by the output voltage which has appeared at the output of the phase detector during a number of foregoing intervals with the actual transmission frequency. Provided that one and the same frequency arrives to the receiver in the same phase position from time to time the output voltage of the phase detector will be zero after a number of whole operation cycles and the phase jumps in the incoming carrier are thereby entirely compensated for. Thus the output of the phase shifter will be a signal having constant frequency without variations in the phase position.

During transient conditions and at variations in the phase position of incoming carrier an error voltage will appear at the output of the phase detector, which voltage will be regulated continuously to zero by negative feed back in the closed regulation circuit. If the variations are sufficiently slow, for example caused by fading, the circuit will be able to follow the variations and the error voltage will be kept near zero. Rapid variations in the phase position of incoming carrier will, on the contrary, pass through the circuit and cause a stepwise increase of the error voltage at the output of the phase detector. Not until a number of complete operation cycles will the error again be regulated to zero provided that the phase after the rapid change is constant or only varies slowly.

The adding device 35 can be suitably constructed such that for measured phase errors which are larger than $\pi/2$ it delivers a number corresponding to the complementary angle of the measured phase error, i.e., the device 35 is made as a modulo-$\pi$-adder. For example if - at a certain occasion - the phase error is $\phi$, where $\phi$ is smaller than $\pi/2$ and the phase of the transmitted carrier is suddenly reversed so that the real phase deviation of the incoming signal immediately after the phase reversing will amount to $\pi + \phi$, the device 35 will still deliver a number which represents the angle $\phi$. The device 34 must in this case have full information about the measured phase deviation and deliver numbers representing angles between 0 and $2\pi$. This can be achieved by ensuring that the phase detector 31 is of such construction that it delivers both sines and cosines for the measured phase deviation, whereby the phase angle is wholly determined.

The useful information is suitable derived on intermediate frequency level from the output of the limiter 30. This can for this purpose be connected to an evaluation unit 37 comprising a discriminator adapted to the actual modulation type. In the evaluation unit 37 may also further filtering be effected.

In the present case when the information is transmitted by the simple type of modulation consisting in the carrier being transmitted with either of two alternative phase positions it is also possible to derive the information from the output of the phase detector 31 or possibly from the output of the converter 34, where for each phase reversing of the transmitted carrier a stepwise change in the value of the signal appears. In this case it is also possible to omit the whole intermediate frequency part by bringing the frequency synthesis device 24 of the receiver to deliver exactly the same frequencies as the frequency synthesis device of the transmitter, whereby already at the first mixing a voltage will be obtained, which represents the measured phase deviation. The phase shifter which compensates for the phase jumps in incoming carrier can then be arranged in any of the supply lines to the mixer, suitably in the connection line between the frequency synthesis device and the mixer. A drawback in this case is that the phase shifter has to operate on different frequencies which complicates the same.

As mentioned the amplitude of the incoming carrier will vary in rhythm with the frequency changes. If another type of modulation than the described phase modulation is used it may be necessary to compensate for the amplitude variations, which for example can be accomplished by means of a circuit of the type shown in FIG. 3.

The amplitude correction circuit consists according to FIG. 3 of an AVC-amplifier 40 adapted to be arranged in the intermediate frequency part of the receiver according to FIG. 2, suitably between the band pass filter 29 and the phase detector 31, whereby the limiter 30 will be superfluous. The output of the amplifier 40 is connected to an amplitude detector 41 producing a voltage which is proportional to the amplitude of the output signal of the amplifier, which voltage is delivered to a subtraction device 42. On a second input the subtraction device receives a reference voltage from an adjustable reference voltage source 43 which voltage represents the desired value of the amplitude. The output voltage from the subtraction device 42 is led to a converter 44 which converts the voltage to digital form. The number appearing at the output of converter 44 is conducted through an adding device 45 to the first register $A_1$ in a shift register matrix 46. This has as many individual registers $A_1$–$A_n$ as the number of frequencies in the frequency pattern. The information in the matrix is shifted in the same manner as described for the matrix 36 in rhythm with the frequency change so that for each frequency change the number stored in the register $A_1$ is shifted to $A_2$, the number stored in $A_2$ is shifted to $A_3$ etc. In the adding device 45 the number appearing in the last register of the matrix 46 is combined with the number appearing at the output of the converter 44. The converter output represents the difference voltage at the output of the subtraction device 42. By the fact that the matrix 46 has as many registers as the number of frequencies in the frequency shifting pattern the two magnitudes which are added in the device 45 will always be related to the same frequency.

The number of magnitude appearing in the last register of the matrix 46 serves as control signal to the AVC-amplifier 40. The gain factor is then regulated in such direction that the output from the subtraction device 52 will be regulated to zero by negative feed back in the closed circuit. The amplitude correction is also based upon the condition that the reflected wave is relatively stable for one and the same frequency, whereby the resulting signal received by the antenna 21 will have substantially constant amplitude from one and the same frequency. In the last register of the matrix 46 a number obtained by combining the error voltages from the subtraction device 42 during a number of foregoing intervals for the same frequency is stored. In device 45 the error voltage appearing at the output of subtraction device 42 for the actual transmission moment is added to this number and the sum is fed into the first register of the matrix 46. Next time the same frequency appears this number is stored in the last register and is used to set the gain factor in the amplifier 40. After a number of complete operation cycles the gain factor in the amplifier 40 will be automatically adjusted for each new frequency in such manner that the error voltage at the output of the device 42 will be substantially zero for all frequencies. The amplitude jumps are then substantially compensated for and at the output of the amplifier 40 will appear a signal having constant amplitude.

A number of modifications of the described equipment are possible within the scope of the invention. Thus the measuring of the phase position of incoming carrier can be made directly on the same without mixing down the carrier to intermediate frequency. This is as mentioned realized by ensuring that that the frequency synthesis device of the receiver delivers exactly the same frequencies as the frequencies of the transmitted carrier. If this phase measurement is made without phase compensation, i.e., without having the phase shifter which is set in dependence upon previously measured phase positions connected in any of the supply lines to the mixer, the output signal from the same will represent the actual phase position of incoming carrier relative to a reference phase position determined by the frequency synthesis device. The memory then has to be constructed in such manner that the number or the magnitude written into the memory for each frequency corresponds to the output voltage of the mixer/phase detector without combining the same with previously stored value. The memory can be made in any suitable manner and for example be static having a memory position associated with each frequency. Instead of a digital memory it is also possible to use a memory for analogue magnitudes for example a capacitive memory, a capacitor being associated with each frequency. The static memory can be combined with a selection mechanism operating in rhythm with the frequency change for activating the different memory cells in successive order. The useful information can also in principle be transmitted by means of any other suitable type of modulation instead of the described phase modulation with two alternative phase positions of the transmitted carrier, for example frequency or amplitude modulation.

What is claimed is:

1. A communications device, comprising a transmitter and a receiver, means in the transmitter for providing a coded carrier signal sequentially switched to at least two different frequencies under the control of a stored program, frequency synthesis means in the receiver for providing a sequence of frequencies corresponding to the carrier frequency sequence, each of the synthesized frequencies differing from the corresponding carrier frequency by an intermediate frequency, a mixer in the receiver connected to the frequency synthesis means and to the received coded carrier signal for forming an intermediate frequency signal from the received signal, a reference oscillator providing an output signal with a fixed phase, a phase shifter in the receiver connected to the received signal and having a control input for adjusting the phase of the received signal, phase detector means in the receiver and connected to the phase shifter and the reference oscillator for providing an output equal to the phase difference between the reference oscillator and the phase shifter output corresponding to each received frequency of the coded carrier signal, a memory connected to the phase detector means for sequentially storing the phase difference corresponding to each received frequency of the coded carrier signal, a feedback loop connected between the output of the memory and the control input of the phase shifter for adjusting the phase of the received coded carrier signal toward the phase of the reference oscillator, and means connecting the frequency synthesis device to the memory for interrogating the memory in the same sequence as the frequency sequence of the received coded carrier signal whereby the stored phase difference of each received frequency is used to adjust the phase of a subsequently received identical frequency.

2. A device as claimed in claim 1, wherein the intermediate frequency is a fixed frequency, wherein the phase shifter is connected to the output side of the mixer, wherein the reference oscillator provides a signal having a fixed frequency equal to the intermediate frequency, and wherein the memory further comprises means for adding the phase difference from the phase detector for each new frequency to the value previously stored for that corresponding frequency.

3. A device as claimed in claim 2, wherein the memory comprises a shift register matrix consisting of a number of columns of memory elements, each column storing phase information corresponding to a different frequency, the frequency synthesis device providing shifting signals for the register, the feedback loop connecting the last column of the shift register to the control input of the phase shifter, and means for adding the value of the last column to the output of the phase detector before storing the sum in the first column of the register.

4. A device as claimed in claim 1, wherein the receiver further comprises an AVC-amplifier connected to the received coded carrier signals and having a control input for adjusting the level of the received coded carrier signals, a reference voltage source, means for generating an amplitude difference signal corresponding to each received frequency of the coded carrier signals and equal to the difference between the amplitude of each received frequency of the coded carrier signals and the amplitude of the reference voltage source, means for storing each amplitude difference frequency, and a feedback loop connecting the output of the storage means to the control input of the AVC-amplifier for adjusting the amplitude of each received frequency of the coded carrier signal with the stored amplitude difference of the corresponding previously received frequency.

* * * * *

°0-1050
(5/69)

UNITED STATES PATENT OFFICE
CERTIFICATE OF CORRECTION

Patent No. 3,838,342 Dated September 24, 1974

Inventor(s) BENGT HARRY BJORKMAN

It is certified that error appears in the above-identified patent and that said Letters Patent are hereby corrected as shown below:

ON THE TITLE PAGE

In section [30]; "Switzerland" should be --Sweden--;

IN THE SPECIFICATION

Col. 2, line 46, "tO" should be --to--;

Signed and sealed this 19th day of November 1974.

(SEAL)
Attest:

McCOY M. GIBSON JR.
Attesting Officer

C. MARSHALL DANN
Commissioner of Patents